United States Patent [19]

Rodriguez

[11] Patent Number: 4,826,182
[45] Date of Patent: May 2, 1989

[54] SEALING RING WITH SPACED RESILIENT AND RIGID PORTIONS

[75] Inventor: Jean-Jacques Rodriguez, Douvaine, France

[73] Assignee: Kugler, Fonderie et Robinetterie S.A., Geneva, Switzerland

[21] Appl. No.: 17,511

[22] Filed: Feb. 17, 1987

[30] Foreign Application Priority Data

Feb. 18, 1986 [CH] Switzerland ............... 00646/86

[51] Int. Cl.$^4$ .............................................. F16J 15/12
[52] U.S. Cl. .................................. 277/165; 277/180; 277/188 A; 277/228
[58] Field of Search ............ 277/101, 165, 180, 188 A, 277/228, 235 R

[56] References Cited

U.S. PATENT DOCUMENTS

| | | | |
|---|---|---|---|
| 2,709,630 | 5/1955 | Patterson | 277/165 |
| 2,823,058 | 2/1958 | Ecker et al. | 277/165 |
| 3,782,735 | 1/1974 | Novosad | 277/22 |
| 3,782,788 | 1/1974 | Koester et al. | . |
| 4,034,993 | 7/1977 | Okada et al. | . |
| 4,305,595 | 12/1981 | Miyagishima et al. | 277/188 A X |
| 4,493,373 | 1/1985 | Jackson | 277/188 A X |
| 4,531,749 | 7/1985 | Jackson et al. | 277/180 X |

FOREIGN PATENT DOCUMENTS

| | | | |
|---|---|---|---|
| 0056222 | 7/1982 | European Pat. Off. | . |
| 920311 | 1/1947 | France | . |
| 1421051 | 11/1965 | France | . |
| 437711 | 7/1948 | Italy | 277/188 A |
| 643641 | 6/1984 | Switzerland | . |
| 537654 | 7/1941 | United Kingdom | 277/180 |
| 602585 | 5/1948 | United Kingdom | 277/188 A |
| 2140879 | 12/1984 | United Kingdom | . |
| 2186641 | 8/1987 | United Kingdom | 277/180 |

Primary Examiner—Robert S. Ward
Attorney, Agent, or Firm—Young & Thompson

[57] ABSTRACT

A sealing ring comprising a resilient ring and a pair of axially spaced coaxial rigid rings secured to the outside of the resilient ring. The rigid rings are spaced from end surfaces of the resilient ring a distance substantially less than the axial extent of a rigid ring. The rigid rings have an axial extent substantially greater than their radial extent. In one embodiment, the resilient ring has on its outer surface an integral annular rib that is disposed between and is in contact with both of the rigid rings, the radially outer surface of the rib being flush with the outer surfaces of the rigid rings. In another embodiment, there is a free space between the rigid rings in the undeformed condition of the resilient ring.

6 Claims, 1 Drawing Sheet

SEALING RING WITH SPACED RESILIENT AND RIGID PORTIONS

The present invention relates to a seal for flat surfaces, more particularly intended to be used to compensate for the differences of tolerances in axial stacks of several assembled parts, for example, in a stop cock or a mechanical mixing tap.

In the manufacture of stop cocks and/or mixing taps, for example, using the assembly of parts with play and necessitating a tight sealing between two flat surfaces, the use of a simple compressible joint for said sealing is not satisfactory for two main reasons: firstly, it is often necessary to make a provisional assembly of the device to determine the amount of play which is the sum of all the tolerances, and then if necessary to rectify one or several surfaces to compensate this play; secondly, the water pressure differences can sweep away, partially or totally, the simple compressible joint into the space to be tightened.

The aim of this invention is to remedy the precited drawbacks making a joint available which enables on the one hand absorbing all the tolerance differences and on the other hand does not risk being displaced by the fluid pressure.

The attached drawing shows the invention schematically and by way of example.

Figure 2:
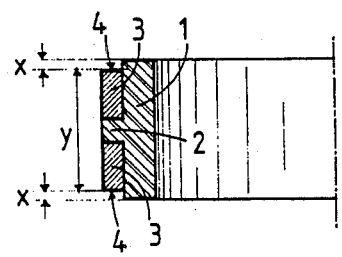
FIGS. 2 and 3 are partial views in cross-section of two variants of the seal according to the invention.
Figure 3:
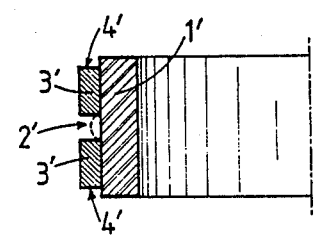

Referring first to FIGS. 2 and 3, there are shown two realisations of the seal according to the invention, each comprising a cylindrical compressible body 1, 1', made of a resilient material, for example rubber or any other similar adequate material. The outside wall of the variant of FIG. 2 shows an annular rib 2 making an axial rest for two rings 3 provided on the body 1 so as to match its outside. These rings are made of a non compressible, rigid material, for examle metal or an adequate plastic material.

In the variant of FIG. 3, having no annular rib on the outside wall of the compressible body 1', the rings 3' are fastened to said wall for example by gluing, vulcanisation, etc . . .

In FIGS. 2 and 3, the joint is shown in rest position, that is, not compressed. In this position, each ring 3,3' makes with the upper, and respectively, lower portion of the compressible body 1,1', a seat 4,4'. The distances "x" between this seat 4,4, and the upper surface and, respectively, lower surface of the body 1, corresponding to the thicknesses of this body 1 which can be axially compressed, are choosen so that once the two portions having the thickness "x" are compressed, the pressure exerted axially by the seal is sufficient to ensure the tightness wanted between the two surfaces between which it is intended to be located.

The distance "y" (see FIG. 2), has to correspond approximately to the distance between the two surfaces to be sealed, all tolerances being considered. If necessary, the seal according to the invention, and more particularly the compressible body 1,1' can further be compressed axially thanks to the presence of the median portion formed by the rib 2 (FIG. 2) or by the portion 2' located between the two glued or vulcanised rings 3' (FIG. 3). This portion 2' deforms convexly outward (see dotted line in FIG. 3).

Figure 1:
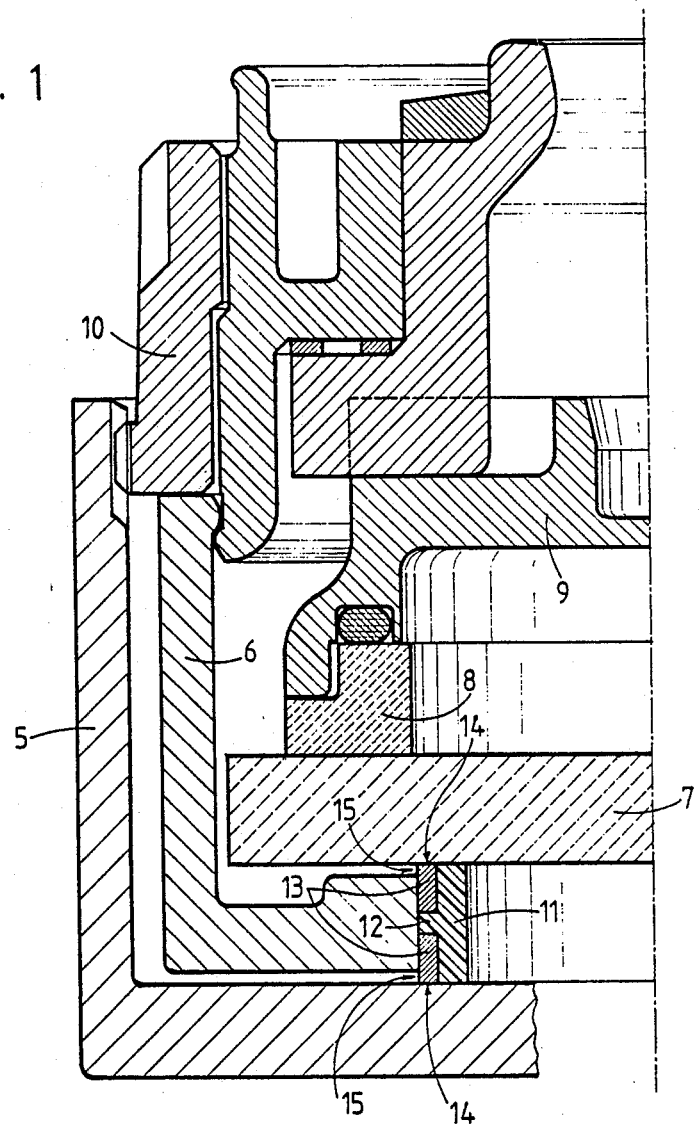
FIG. 1 is a partial view in axial cross-section of a ceramic plates tap incorporating a seal according to the invention.

The seal according to the invention can be used, for example as shown on FIG. 1, in the assembly of different parts constituting a stop cock, or a mechanical mixing tap of the type described for example in the Swiss Pat. No. 643.641 of the same applicant.

The tap shown schematically and partially in FIG. 1 comprises a body 5, an inside sleeve 6, as well as two ceramic plates, the first one 7 being fixed and the second one 8 mounted for displacement parallel to the upper surface of the first plate 7 and resting in contact therewith. The ceramic plates 7,8 are of known type and have each apertures located in such a way that the displacement in translation of the movable plate 8 on the fixed plate 7 opens or closes the tap. The movement of translation is controlled by a lever (not shown) cooperating with the intermediate movable part 9, itself fast with the movable plate 8. The whole assembly forming the tap is maintained by a nut 10 providing for the axial tighting of all constitutive parts of the assembly.

Finally to ensure the tightness of this assembly, more particularly between the lower surface of the fixed plate 7 and the bottom of the body 5, a seal 11 is located between these two surfaces. This seal 11 corresponds to the one shown in FIG. 2; in FIG. 1, it is represented in its service, compressed position. In this position, the upper and lower portions of the joint are completely compressed and the annular edges 14 of the rings 13 are in contact with the two surfaces between which the tightness has to be ensured.

The seal 11 thus enables compensating for all the differences due to the tolerances of the constitutive parts of the assembly by the compression of the two upper and, respectively, lower portions of said joint, as well as the annular rib 12. Practically, the totality of the accommodation of differences of tolerances is about 2 mm., i.e., about 30% of the total thickness of the seal 11. The tightness of the assembly is thus realized, and the presence of the rigid rings 13 avoids any risk of damage to the seal, or that this seal may be pushed into the voids 15 through the water pressure.

Of course, the seal can have, seen from above, any adquate shape corresponding to the surfaces to be sealed. The rings have then also to have a corresponding shape to match completely the outside of said compressible body.

I claim:

1. A sealing ring comprising a resilient ring and a pair of axially spaced coaxial rigid rings secured to the outside of said resilient ring, said rigid rings being spaced from end surfaces of said resilient ring, said end surfaces extending in both axial directions beyond said rigid rings.

2. A sealing ring as claimed in claim 1, the distance by which said rigid rings are spaced from said ends of said resilient ring being substantially less than the axial extent of a said rigid ring.

3. A sealing ring as claimed in claim 1, said rigid rings having an axial extent substantially greater than their radial extent.

4. A sealing ring as claimed in claim 1, said resilient ring having on its outer surface an integral annular rib that is disposed between and is in contact with both of said rigid rings.

5. A sealing ring as claimed in claim 4, the radially outer surface of said rib being flush with the outer surfaces of said rigid rings.

6. A sealing ring as claimed in claim 1, there being a free space between said rigid rings in the undeformed condition of the resilient ring.

* * * * *